United States Patent
Gibson et al.

(10) Patent No.: US 11,477,074 B2
(45) Date of Patent: *Oct. 18, 2022

(54) REMOTE LINE INTEGRATION

(71) Applicant: Rockwell Automation Technologies, Inc., Mayfield Heights, OH (US)

(72) Inventors: William J. Gibson, Louisville, KY (US); Gregory S. Wilcox, Painesville Township, OH (US); Scott N. Sandler, Chagrin Falls, OH (US); Douglas B. Weber, Glendale, WI (US); Timothy S. Biernat, Franklin, WI (US); Vijayant Kaura, Bolingbrook, IL (US); Clifford J. Whitehead, Jr., Cleveland, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 171 days.

This patent is subject to a terminal disclaimer.

(21) Appl. No.: 16/914,920

(22) Filed: Jun. 29, 2020

(65) Prior Publication Data

US 2020/0328937 A1    Oct. 15, 2020

Related U.S. Application Data

(63) Continuation of application No. 15/836,266, filed on Dec. 8, 2017, now Pat. No. 10,700,924.

(51) Int. Cl.
*H04L 29/00*    (2006.01)
*H04L 41/08*    (2022.01)
(Continued)

(52) U.S. Cl.
CPC .......... *H04L 41/08* (2013.01); *H04L 63/0272* (2013.01); *H04L 67/04* (2013.01);
(Continued)

(58) Field of Classification Search
CPC ......... H04L 67/04; H04L 67/18; H04L 67/28; H04L 41/08; H04L 63/0272; H04L 67/10;
(Continued)

(56) References Cited

U.S. PATENT DOCUMENTS

| | | | |
|---|---|---|---|
| 7,672,262 B2* | 3/2010 | McCoy | E21B 47/008 370/316 |
| 7,746,824 B2* | 6/2010 | Gautney | H04L 67/14 370/395.2 |

(Continued)

*Primary Examiner* — Don G Zhao

(57) ABSTRACT

Techniques to facilitate communication between remote industrial assets are disclosed herein. In at least one implementation, a computing system provides a virtual private network (VPN) service for an industrial automation network of an industrial automation enterprise. The computing system communicates with a first gateway system to establish a first connection between a first industrial asset and the VPN service for the industrial automation network. The computing system also communicates with a second gateway system to establish a second connection between a second industrial asset and the VPN service for the industrial automation network, wherein the second industrial asset is located at a disparate location than the first industrial asset. Bi-directional communications are routed between the first industrial asset and the second industrial asset to enable interactions between the first industrial asset and the second industrial asset as if they were directly connected over a same local communication network.

20 Claims, 5 Drawing Sheets

(51) Int. Cl.
  *H04L 67/10* (2022.01)
  *H04L 9/40* (2022.01)
  *H04L 67/04* (2022.01)
  *H04L 67/52* (2022.01)
  *H04L 67/56* (2022.01)
  *H04L 43/50* (2022.01)

(52) U.S. Cl.
  CPC .............. *H04L 67/10* (2013.01); *H04L 67/52* (2022.05); *H04L 67/56* (2022.05); *H04L 43/50* (2013.01); *H04L 63/00* (2013.01); *H04L 63/0428* (2013.01)

(58) Field of Classification Search
  CPC ............... H04L 43/50; H04L 29/06551; H04L 63/0428; H04L 67/52; H04L 67/56; H04L 63/00
  See application file for complete search history.

(56) References Cited

U.S. PATENT DOCUMENTS

| | | | | |
|---|---|---|---|---|
| 10,700,924 B2* | 6/2020 | Gibson | ................... | H04L 67/10 |
| 2005/0165834 A1* | 7/2005 | Nadeau | ................... | H04L 41/28 |
| 2007/0156898 A1* | 7/2007 | Appleby | ................. | H04L 63/10 |
| | | | | 709/225 |
| 2008/0113655 A1* | 5/2008 | Angelhag | ............... | H04L 67/04 |
| | | | | 455/414.2 |
| 2009/0172117 A1* | 7/2009 | Bedi | ................. | H04W 52/0216 |
| | | | | 709/206 |
| 2011/0069634 A1* | 3/2011 | Hajiaghayi | ............. | H04L 45/00 |
| | | | | 370/254 |
| 2013/0275572 A1* | 10/2013 | Schaetzle | .......... | H04W 52/0216 |
| | | | | 709/223 |
| 2014/0181951 A1* | 6/2014 | Birkhofer | ........... | H04L 63/0218 |
| | | | | 726/12 |
| 2014/0280940 A1* | 9/2014 | Chapman | ................ | H04L 63/02 |
| | | | | 709/225 |
| 2014/0351920 A1* | 11/2014 | Madani | ................... | H04L 67/10 |
| | | | | 726/14 |
| 2015/0058738 A1* | 2/2015 | Benkert | ................ | G06F 3/0482 |
| | | | | 715/736 |
| 2015/0195265 A1* | 7/2015 | Chen | ................... | H04L 63/0272 |
| | | | | 726/3 |
| 2015/0281356 A1* | 10/2015 | Maturana | ................ | G06F 9/541 |
| | | | | 709/217 |
| 2015/0281453 A1* | 10/2015 | Maturana | .............. | G06F 9/5072 |
| | | | | 379/265.12 |
| 2017/0006034 A1* | 1/2017 | Link, II | ................. | H04L 63/029 |
| 2017/0155633 A1* | 6/2017 | Maria | ................... | H04L 63/105 |
| 2018/0143961 A1* | 5/2018 | Thomas | ................. | H04L 67/10 |
| 2018/0176084 A1* | 6/2018 | McNab | ............. | G05B 19/4185 |
| 2019/0029074 A1* | 1/2019 | Inoue | ...................... | H04L 69/40 |

* cited by examiner

REMOTE LINE INTEGRATION

RELATED APPLICATIONS

This application is a continuation of, and claims the benefit of priority to, U.S. Pat. No. 10,700,924, granted on Jun. 30, 2020, and entitled "Remote Line Integration," which is hereby incorporated by reference in its entirety.

TECHNICAL FIELD

Aspects of the disclosure are related to computing hardware and software technology.

TECHNICAL BACKGROUND

Industrial automation environments utilize various machines during the industrial manufacturing process, such as drives, pumps, motors, and robots. These machines have various moving parts and other components that are driven by instructions received from industrial controller systems. Machine builders, Solution Providers, and other content creators typically produce the control logic needed to run on these controllers to control the machines.

Industrial environments also commonly include a Human-Machine Interface (HMI). An HMI typically receives and processes the status data from the machines to generate various graphical displays, which may indicate the current and historical performance of the machines as well as actionable information such as process, machine, or equipment diagnostics and alarms. In traditional implementations, the HMI may also provide a mechanism for an operator to send control instructions to a control system that controls the machines. For example, an operator might use the HMI to direct the control system to update drive parameters, turn on a pump, speed-up a motor, or stop a robot.

OVERVIEW

Techniques to facilitate communication between remote industrial assets are disclosed herein. In at least one implementation, a computing system provides a virtual private network (VPN) service for an industrial automation network of an industrial automation enterprise. The computing system communicates with a first gateway system to establish a first connection between a first industrial asset and the VPN service for the industrial automation network. The computing system also communicates with a second gateway system to establish a second connection between a second industrial asset and the VPN service for the industrial automation network, wherein the second industrial asset is located at a disparate location than the first industrial asset. Bi-directional communications are routed between the first industrial asset and the second industrial asset to enable interactions between the first industrial asset and the second industrial asset as if the first industrial asset and the second industrial asset were directly connected over a same local communication network.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

When an industrial automation enterprise such as a production facility acquires an industrial asset such as a new machine for use in the manufacturing process, integrating the new machine into an existing production line can be cumbersome and time consuming. For example, machines are typically developed and tested independently at isolated sites by the original equipment manufacturer (OEM) or Machine Builder, and are not connected to other machines on the plant network until they are physically installed into the production line on the plant floor of the end user. Unfortunately, a lot of time is invested in starting up, configuring, and commissioning new industrial assets in order to electronically and logically integrate the assets into the production line to test and verify their proper operation, including data exchange, response to control instructions, interactions with other machinery, and other functionality.

Implementations disclosed herein provide a remote connection capability for industrial assets to remotely interact with other remote industrial assets or enterprises that they will ultimately be interfacing with and connecting to at the end user's site. For example, new industrial machinery and other assets that are still located at the OEM sites can be connected to each other for remote setup and configuration, prior to actual deployment to the end user. Such remote integration provides for pre-deployment testing of individual machine functionality, machine-to-machine interactions, and line integration testing, including verification of cycle times, responses to control signals and instructions from a line controller, and other operations of machines within the production line. Accordingly, when the machines are physically delivered to the end user, the machines may be pre-configured and pre-verified to work with each other and with existing systems and machinery, thereby providing a more rapid deployment and seamless integration of the machines into the production line.

Figure 1:
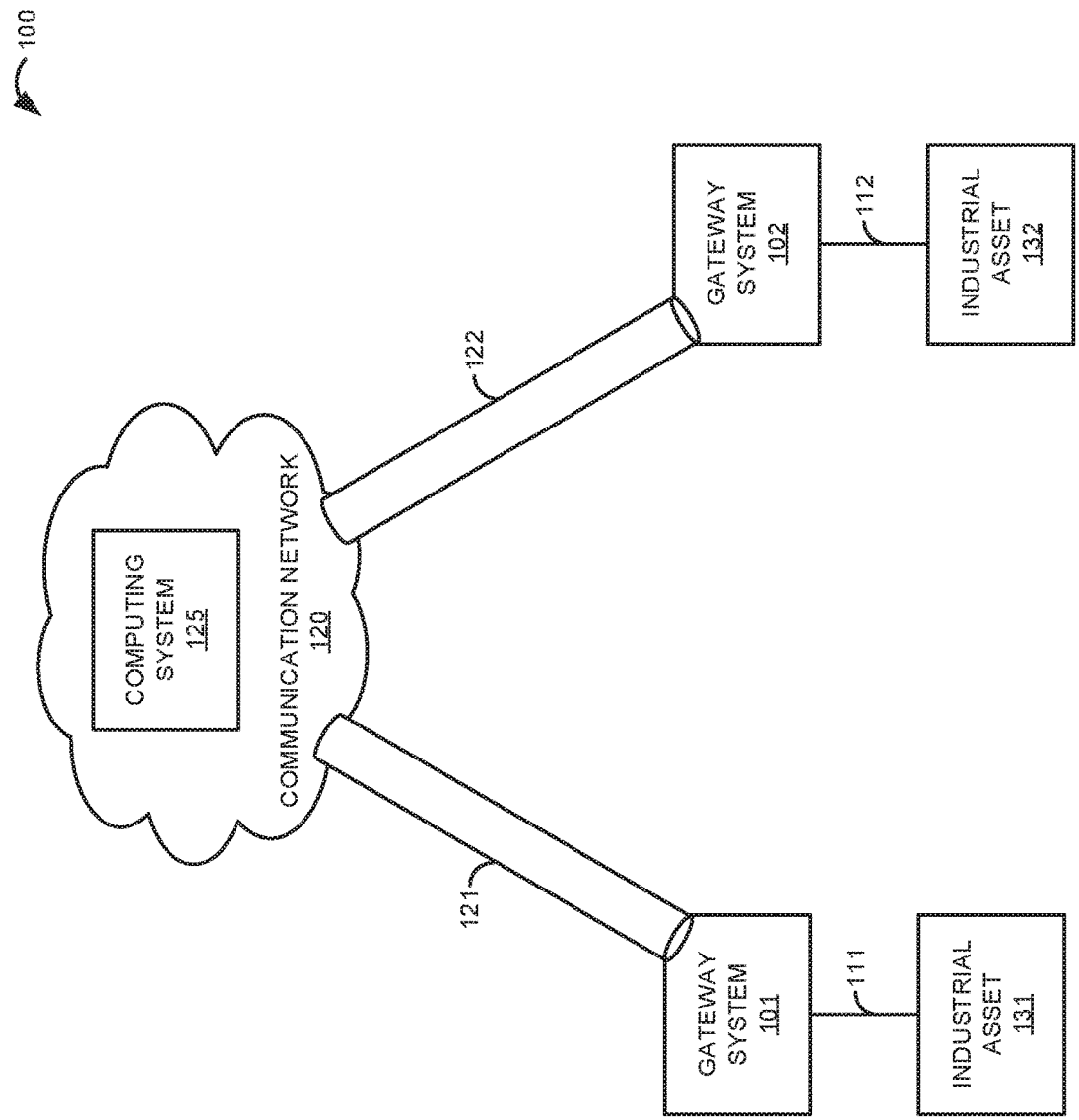
FIG. 1 is a block diagram that illustrates a communication system in an exemplary implementation.
Figure 2:
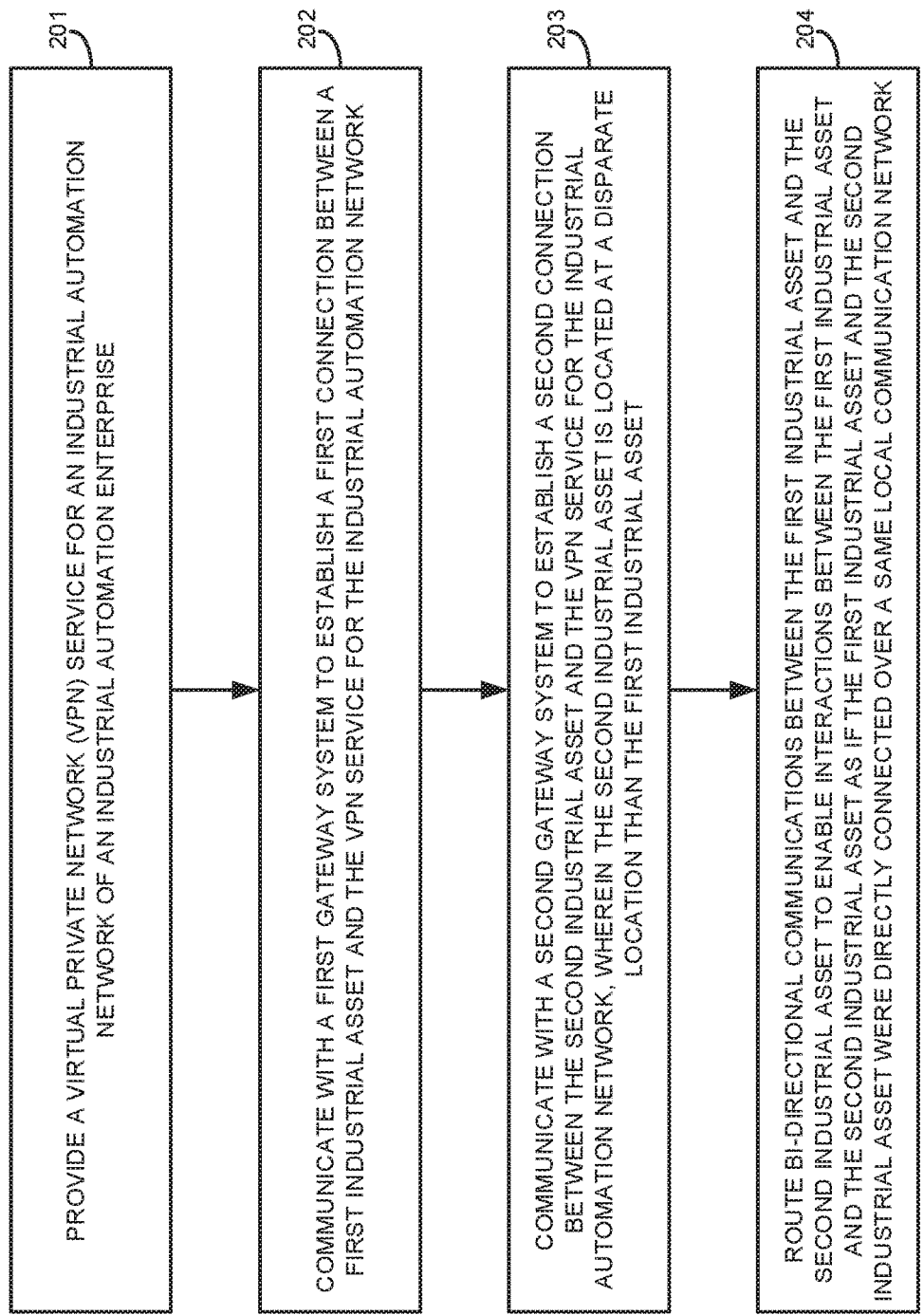
FIG. 2 is a flow diagram that illustrates an operation of a communication system in an exemplary implementation.
Figure 3:
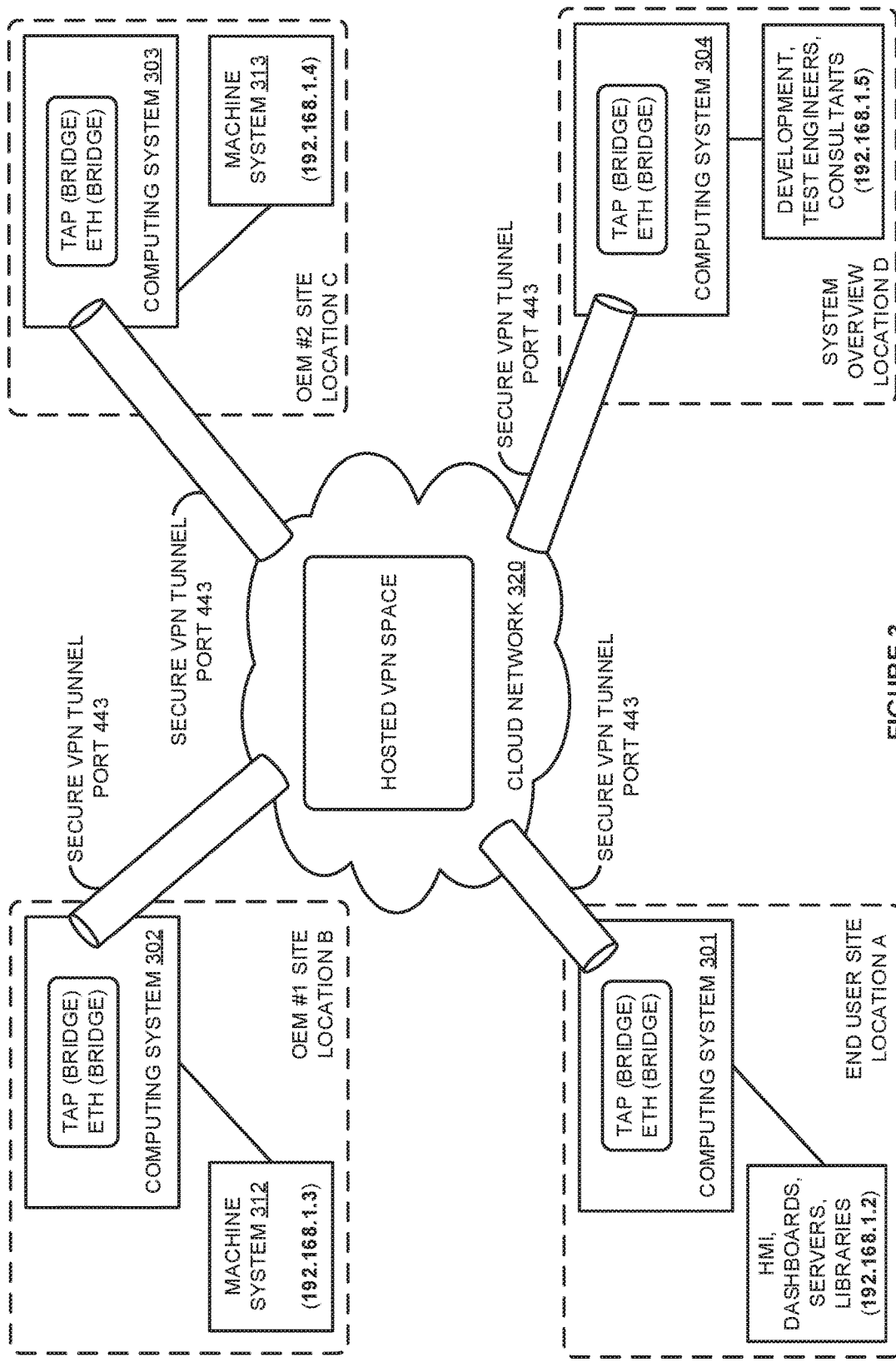
FIG. 3 is a block diagram that illustrates a communication system in an exemplary implementation.
Figure 4:
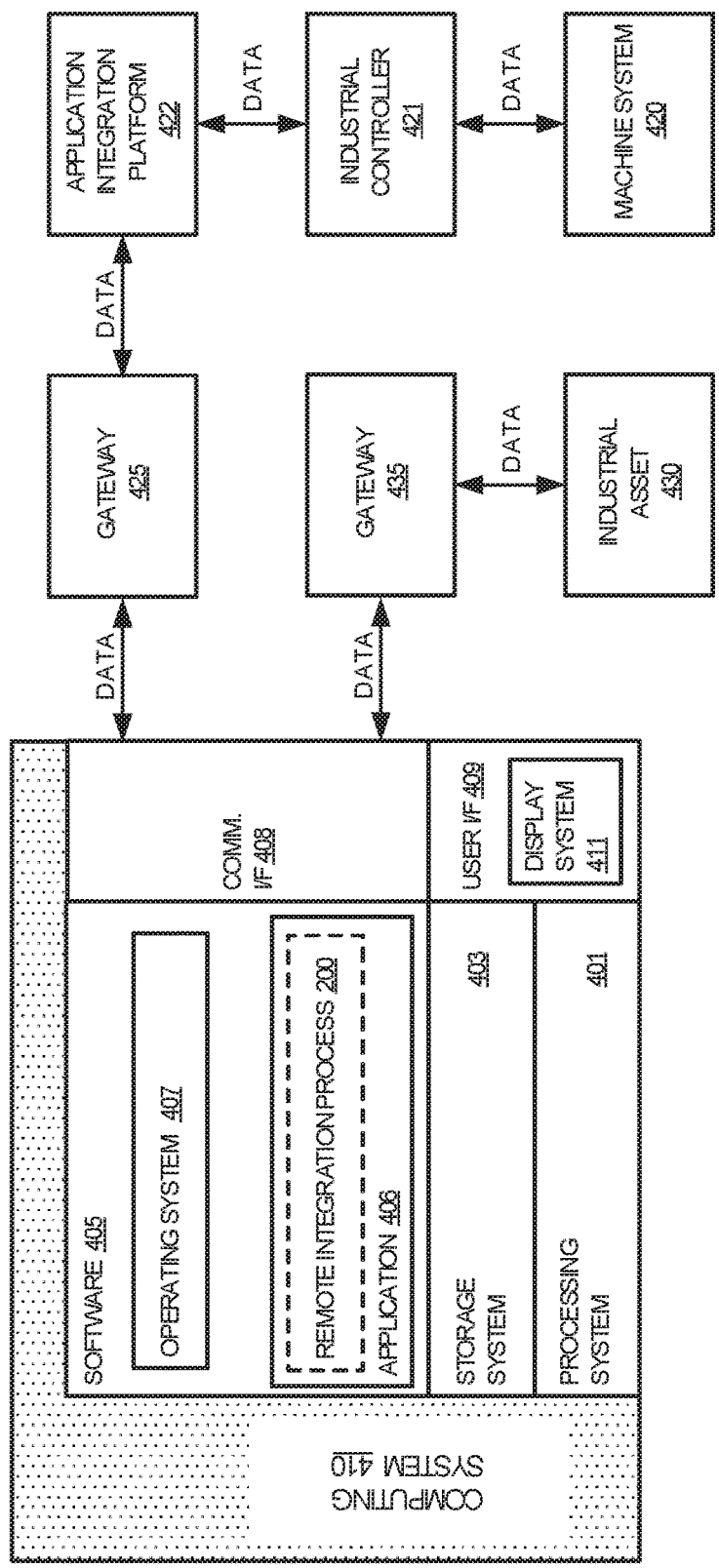
FIG. 4 is a block diagram that illustrates an operational scenario involving a computing system in an industrial automation network in an exemplary implementation.
Figure 5:
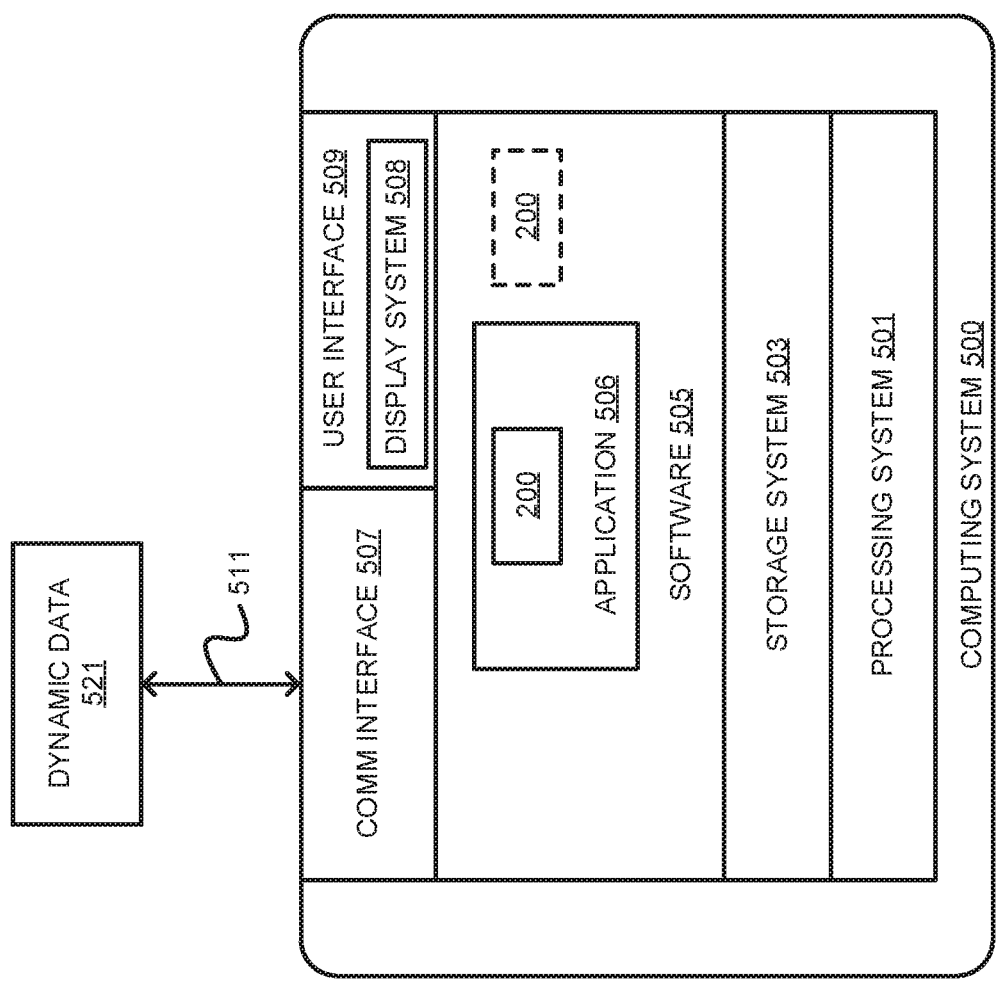
FIG. 5 is a block diagram that illustrates a computing system in an exemplary implementation.

Referring now to the drawings, FIG. 1 illustrates a communication system that may be employed to facilitate communication between remote industrial assets in an exemplary implementation. FIG. 2 is a flow diagram that illustrates a remote integration process that may be performed by a computing system. FIG. 3 illustrates a cloud-based communication system of an industrial automation network in an exemplary implementation. FIG. 4 illustrates an exemplary industrial automation network that includes a computing system that may be used to execute a remote integration process, and FIG. 5 illustrates an exemplary computing system that may be used to perform any of the remote integration processes and operational scenarios described herein.

Turning now to FIG. 1, communication system 100 is illustrated in an exemplary implementation. Communication system 100 includes gateway systems 101 and 102, secure tunnels 121 and 122, industrial assets 131 and 132, communication network 120, and computing system 125. Industrial asset 131 and gateway system 101 communicate over communication link 111, while gateway system 101 is in communication with communication network 120 and computing system 125 over secure tunnel 121. Likewise, industrial asset 132 and gateway system 102 communicate over communication link 112, while gateway system 102 is in communication with communication network 120 and computing system 125 over secure tunnel 122. In this example, industrial assets 131 and 132 are connected to communication network 120 over separate and distinct local communication networks. In at least one implementation, industrial asset 132 could be located at a disparate location than industrial asset 131. For example, industrial asset 131 could be located within a premises of an industrial automation enterprise, such as a manufacturing plant, factory, or some other industrial facility, whereas industrial asset 132 could be located at a different geographical location, such as an OEM manufacturing site. Industrial assets 131 and 132 may comprise any asset associated with or employed in industrial operations. In some examples, the industrial assets 131 and 132 could comprise real, physical machinery, such as a mechanical device, industrial controller, or some other machine employed in industrial automation operations, but could also comprise virtual representations of a machine, such as an emulation, simulation application, or some other digital representation of a physical asset. Further, industrial assets 131 and 132 could comprise other systems associated with industrial operations, such as a cloud monitoring application, line integration application, analytic process, HMI systems, dashboards, overall equipment effectiveness (OEE) systems, faceplates, libraries, databases, servers, system integrators, development systems, testing systems, and any other industrial systems. Note that there would typically be more industrial assets 131 and 132 connected to communication network 120 but only two are shown in communication system 100 for clarity.

In operation, computing system 125 provides a secure VPN connection for gateway systems 101 and 102 to exchange communications between industrial assets 131 and 132 through communication network 120 over secure tunnels 121 and 122, respectively. Although industrial assets 131 and 132 may be physically dispersed in geographically diverse locations, they are able to connect to each other over the secure VPN connection as if they were physically connected to the same local network at the same location. In at least one implementation, gateway systems 101 and 102 operate as network bridges to connect respective industrial assets 131 and 132 to the VPN service provided by computing system 125 and are assigned Internet protocol (IP) addresses from the same addressing scheme and subnetwork. In this manner, industrial assets 131 and 132 are able to communicate and interact as if directly connected over the same local communication network. However, in some implementations, computing system 125 may explicitly route packets through communication network 120 over the secure VPN connection, which offers better control over bandwidth and security but is more difficult to configure and limits layer 2 communication options. An exemplary operation of computing system 125 and communication system 100 will now be described in greater detail with respect to FIG. 2.

FIG. 2 is a flow diagram that illustrates an operation 200 of a computing system in an exemplary implementation. The operation 200 shown in FIG. 2 may also be referred to as remote integration process 200 herein. The steps of the operation are indicated below parenthetically. The following discussion of operation 200 will proceed with reference to computing system 125 and other elements of communication system 100 of FIG. 1 in order to illustrate its operations, but note that the details provided in FIG. 1 are merely exemplary and not intended to limit the scope of process 200 to the specific implementation shown in FIG. 1.

Operation 200 may be employed to operate a computing system to facilitate communication between remote industrial assets. As shown in the operational flow of process 200, computing system 125 provides a virtual private network (VPN) service for an industrial automation network of an industrial automation enterprise (201). In some implementations, the VPN service provided by computing system 125 could comprise a cloud service hosted by computing system 125. The VPN service may then provide secure connectivity and data routing between remote industrial assets 131 and 132. For example, in at least one implementation, computing system 125 could provide the VPN service by operating as a VPN server in bridged mode with traffic routing enabled, providing a secure connection for industrial assets 131 and 132 to communicate via respective gateway systems 101 and 102. In this scenario, gateway systems 101 and 102 may operate as network bridges to connect respective industrial assets 131 and 132 to the VPN service provided by computing system 125. For example, in some implementations computing system 125 may provide the VPN service for the industrial automation network by establishing a secure tunnel 121 and 122 to the VPN service for the industrial automation network. Accordingly, a first gateway system 101 may be configured to bridge a first industrial asset 131 onto the industrial automation network through the secure tunnel 121, and a second gateway system 102 could be configured to bridge a second industrial asset 132 onto the industrial automation network through the secure tunnel 122. However, in at least one implementation, computing system 125 may explicitly route packets through communication network 120 over secure tunnels 121 and 122 to their destinations, which could include gateway systems 101 and 102 and/or industrial assets 131 and 132.

Computing system 125 communicates with a first gateway system 101 to establish a first connection between a first industrial asset 131 and the VPN service for the industrial automation network (202). Similarly, computing system 125 communicates with a second gateway system 102 to establish a second connection between a second industrial asset 132 and the VPN service for the industrial automation network, wherein the second industrial asset 132 is located at a disparate location than the first industrial asset 131 (203). In some implementations, computing system 125 communicating with the first and second gateway systems 101 and 102 to establish the respective first and second connections could include various network handshaking procedures, credential verification and validation, security protocol negotiations, and other networking operations for connecting to the VPN service for the industrial automation network. In at least one implementation, computing system 125 could communicate with gateway systems 101 and 102 to establish secure physical and logical connectivity of remote automation assets 131 and 132 into a unified system, line, and workflow. Computing system 125 could operate as a broker application to provide secure connectivity and data routing between remote automation assets 131 and 132 in some implementations. For example, computing system 125 could operate as the hub in a hub-and-spoke topology to provide the broker application or middleman functionality for managing the connections between industrial assets 131 and 132. Further, in at least one implementation, a predetermined or scheduled time could also be coordinated for establishing the first and second connections to the VPN service. For example, computing system 125 could communicate with the first and second gateway systems 101 and 102 to establish the respective first and second connections during a scheduled timeframe.

Computing system 125 routes bi-directional communications between the first industrial asset 131 and the second industrial asset 132 to enable interactions between the first industrial asset 131 and the second industrial asset 132 as if the first industrial asset 131 and the second industrial asset 132 were directly connected over a same local communication network (204). Effectively, although the second industrial asset 132 is located at a disparate location than the first industrial asset 131, assets 131 and 132 are able to communicate and exchange data as if they were being operated in the same location and connected to the same local network. In some implementations, in order to route the bi-directional communications between the first industrial asset 131 and the second industrial asset 132, computing system 125 could provide a centralized functionality with the ability to segment the data traffic and organize and coordinate the communication exchange, regardless of the underlying connection schemes of the first industrial asset 131 and the second industrial asset 132. The interactions between the first industrial asset 131 and the second industrial asset 132 enabled by computing system 125 could comprise any functionality that assets 131 and 132 are capable of performing when directly connected over the same local connection in the same facility. For example, the interactions between the first industrial asset 131 and the second industrial asset 132 could comprise remotely testing line integration between the first industrial asset 131 and the second industrial asset 132. In some implementations, remotely testing the line integration between the first industrial asset 131 and the second industrial asset 132 could comprise utilizing a line controller function to coordinate a work flow of the first industrial asset 131 and the second industrial asset 132. In addition, further pre-deployment setup and testing can be performed, such as verification of machine or equipment identities or signatures, valid machine configurations, version control of machine configurations, programs, subsystems, modules, and other components, verifying that assets are connected to other assets that they support, among other functionality. For example, other interactions between industrial assets 131 and 132 that may be facilitated by the connections to the VPN service provided by computing system 125 could include testing of data tag mapping, ensuring that assets 131 and 132 are assigned IP addresses from the same range and on the same subnetwork, verifying input and output signals, identifying faulty components, firmware incompatibilities, improper configurations, and other issues, and any other functionality associated with the interaction of industrial assets 131 and 132.

Advantageously, by providing the VPN service for an industrial automation network, computing system 125 facilitates communication between remote industrial assets 131 and 132, thereby enabling line integration testing and verification of other interactive functionality. In this manner, potential issues and problems may be identified and resolved prior to deployment, saving valuable time and other resources. Further, the pre-deployment testing enabled by the techniques disclosed herein may help reduce the amount of time that system engineers need to spend on-site when installing a new industrial asset 131 or 132 on the premises of an industrial automation enterprise, ensuring smoother and more seamless deployment. Another exemplary operation of a communication system will now be discussed with respect to FIG. 3.

FIG. 3 illustrates an operation of communication system 300 in an exemplary embodiment. Communication system 300 provides an example of communication system 100, although system 100 could use alternative configurations. The following operations could be executed by computing system 125 and other elements of communication system 100, and could also be combined with operation 200 of FIG. 2 in some implementations.

Communication system 300 includes computing systems 301-304, machine systems 312 and 313, and cloud network 320. Computing systems 301-304 provide examples of gateway systems 101 and 102, although gateway systems 101 and 102 could use alternative configurations. In this example, hosted VPN space is provided as a cloud service over cloud network 320. Various industrial systems and devices operating at geographically diverse locations are connected over the VPN via secure tunnels. The locations are labeled A through D. Location A provides an example of an end user site, such as a manufacturing plant floor. The end user site at location A includes HMI systems, dashboards, servers, libraries, OEE systems, databases, faceplates, machines, controllers, and other systems operated by the end user. Although all of these systems would typically be allocated a range of several different IP addresses, they are shown as having only been assigned a single IP address of 192.168.1.2 in this example for clarity. Location B comprises a manufacturing site of OEM #1, representing a machine builder of machine system 312. Machine system 312 has been allocated an IP address of 192.168.1.3. Likewise, location C comprises a manufacturing site of OEM #2, representing a machine builder of machine system 313. Machine system 313 has been allocated an IP address of 192.168.1.4. Finally, location D provides an example of a system overview location, which may include development systems, test engineers, consultants, systems and solutions business (SSB) systems, system integrators, and other management systems. Again, although all of these systems may commonly be allocated a range of several different IP addresses, they are shown as having only been assigned a single IP address of 192.168.1.5 in this example for clarity.

In this example, the end user is acquiring new machine systems 312 and 313 from different machine builders. The machine systems 312 and 313 are built in different geographical facilities, referred to as locations B and C herein. The machine systems 312 and 313 are designed and developed by the OEMs with remote machine development support that enables remote verification by control vendors and the end user against the end user specification. Machine systems 312 and 313 may undergo independent internal testing by their respective OEMs as well as factory acceptance testing with the end user.

In operation, a secure VPN connection is hosted in the cloud network 320 specializing in machine communication. The VPN service could be configured in bridged mode with traffic routing enabled. Security could be provided by secure sockets layer (SSL), transport layer security (TLS), or any other cryptographic security protocol. Computing systems 301-304 are configured to operate as gateways to bridge the various systems at locations A through D onto the secure VPN. To effectuate these connections, computing systems 301-304 are first connected to the Internet and configured to connect to the VPN service. The terminal access point (TAP) and Ethernet (ETH) adapters are configured in bridge mode in order to bridge the VPN and machine networks at the various locations. Once connected, the systems are able to communicate through secure VPN tunnels and exchange data and other communications as if they were all directly connected on the same local area network of the end user site. However, in some implementations, instead of bridging, packets may be explicitly routed through the network over the secure VPN connection, which offers better control over bandwidth and security but is more difficult to configure and limits layer 2 communication options.

By remotely interfacing and connecting these systems, machine-to-machine and machine-to-plant integration can be tested and verified prior to deploying the machines from the OEM sites to the end user location, which greatly reduces the integration time when new machine systems 312 and 313 are physically installed into the production line at the end user site. For example, a virtual site acceptance pre-deployment test can be performed to integrate the individual machine systems 312 and 313 into a cohesive system by enabling a remote connection capability and performing the service to electronically integrate the machines together such that they can be functionally operated as intended in the end user's facility, including interactions between the machines and maintenance systems, information systems, databases, and the like. Accordingly, in the pre-deployment phase when machine systems 312 and 313 are still at the OEM sites, these machines can be remotely connected to enable communication with the existing machines that are upstream and downstream in the production line at the end user site. A line controller function is then responsible for coordinating the operation and work flow of the machines, among other functionality, such as collecting and storing data, aggregation, analysis, reporting, brokering, and other tasks. By remotely testing the integration of machine systems 312 and 313 into the production line, various aspects of the operation of the machines can be verified prior to actual deployment. For example, the end user can ensure that the data registers are all mapped from the machines to the correct destinations, and that control data or signaling is properly delivered to the machines and the expected responses are produced. In one example, a first machine may send a message to the next machine in the line to indicate that the first machine is finished processing and that control is being passed to the next machine, and this interaction between the machines can be monitored and verified for proper operation.

In addition to providing the connectivity, the hosted VPN service provider could secure contractual rights to the data being exchanged among the various systems. For example, a commercial arrangement can be made that defines the beneficial ownership rights of the data, enabling beneficial use of the asset data by the VPN service provider. The data may be collected and stored in a database for historical record keeping. In addition, data may be observed or extracted from an asset in order to perform analysis on the data and automatically provide feedback into the operation of the asset. Such feedback data could provide insight into the correctness of the asset's decisions and operations, which may be further provided to artificial intelligence and machine learning systems, thereby allowing these systems to learn and improve their accuracy over time. Analysis on the asset data can also be performed to generate visualizations of the data such as charts and trends so that a human operator can take action on the data. Analysis of the data may also be performed for asset quality and reliability purposes, which may be used to improve future versions or generations of the asset.

Beneficially, the hosted VPN service provides the ability to remotely connect, develop, test, and verify the operations of machine systems 312 and 313 prior to shipping the machines to the end user site. For example, pre-deployment testing of the specific hardware, firmware, control logic, add-on instructions (AOIs), code, tags, alarms, cycle times, HMI, IP addresses, and other properties of new machines systems 312 and 313 to verify the proper revision, compatibility, and compliance to standards can be performed when the machines are still at the OEM sites. By enabling this pre-startup testing in-line with other machines, the line controller, and other plant systems, the ease of integration when the machines systems 312 and 313 are finally deployed and physically installed at the end user site is greatly improved, resulting in reduced production line downtime, faster startup, and significant time and cost savings.

Referring back to FIG. 1, computing system 125 comprises a processing system and communication transceiver. Computing system 125 may also include other components such as a user interface, data storage system, and power supply. Computing system 125 may reside in a single device or may be distributed across multiple devices. Examples of computing system 125 include mobile computing devices, such as cell phones, tablet computers, laptop computers, notebook computers, as well as any other type of mobile computing devices and any combination or variation thereof. Examples of computing system 125 also include desktop computers, server computers, cloud computing host systems, and virtual machines, as well as any other type of computing system, variation, or combination thereof. In some implementations, computing system 125 could comprise a mobile device capable of operating in a server-like fashion which, among other uses, could be utilized in a wireless mesh network.

Communication network 120 could comprise multiple network elements such as routers, gateways, telecommunication switches, servers, processing systems, or other communication equipment and systems for providing communication and data services. In some examples, communication network 120 could comprise wireless communication nodes, telephony switches, Internet routers, network gateways, computer systems, communication links, or some other type of communication equipment, including combinations thereof. Communication network 120 may also comprise optical networks, packet networks, wireless mesh networks (WMN), local area networks (LAN), metropolitan area networks (MAN), wide area networks (WAN), cloud networks, or other network topologies, equipment, or systems, including combinations thereof. Communication network 120 may be configured to communicate over metallic, wireless, or optical links. Communication network 120 may be configured to use time-division multiplexing (TDM), Internet Protocol (IP), Ethernet, optical networking, wireless protocols, communication signaling, peer-to-peer networking over Bluetooth, Bluetooth low energy, Wi-Fi Direct, near field communication (NFC), or some other communication format, including combinations thereof. In some examples, communication network 120 includes further access nodes and associated equipment for providing communication services to several computer systems across a large geographic region.

Gateway systems 101 and 102 each individually comprise a processing system and a communication transceiver. Gateway systems 101 and 102 may also include other components such as a router, server, data storage system, and power supply. Gateway systems 101 and 102 may each individually reside in a single device or may be distributed across multiple devices. Gateway systems 101 and 102 may be individual discrete systems or may be integrated within other systems, including other systems within communication system 100.

Industrial assets 131 and 132 may comprise any asset associated with or employed in industrial operations. In some examples, the industrial assets 131 and 132 could comprise real, physical machinery, such as a mechanical device, industrial controller, programmable logic controller (PLC), or some other machine or equipment employed in industrial automation operations, but could also comprise virtual representations of a machine, such as an emulation, simulation application, or some other digital representation of a physical asset. Further, industrial assets 131 and 132 could comprise other systems associated with industrial operations, such as a cloud monitoring application, line integration application, analytic process, HMI systems, dashboards, overall equipment effectiveness (OEE) systems, faceplates, libraries, databases, servers, system integrators, development systems, testing systems, and any other industrial systems. In some examples, industrial assets 131 and 132 could each individually comprise a sensor, drive, pump, filter, drill, motor, robot, fabrication machinery, mill, printer, or any other industrial automation equipment. Additionally, industrial assets 131 and 132 could comprise other industrial equipment, such as a brew kettle in a brewery, a reserve of coal or other resources, or any other element that may reside in an industrial automation environment.

Communication links 111, 112, 121, and 122 use metal, air, space, optical fiber such as glass or plastic, or some other material as the transport medium—including combinations thereof. Communication links 111, 112, 121, and 122 could use various communication protocols, such as TDM, IP, Ethernet, telephony, optical networking, hybrid fiber coax (HFC), communication signaling, wireless protocols, or some other communication format, including combinations thereof. Communication links 111, 112, 121, and 122 could be direct links or may include intermediate networks, systems, or devices.

Turning now to FIG. 4, a block diagram that illustrates an industrial automation network 400 in an exemplary implementation is shown. Industrial automation network 400 provides an example of an industrial automation network that may be utilized to implement the remote integration processes disclosed herein, but other network topologies could also be used. Industrial automation network 400 includes computing system 410, machine system 420, industrial controller 421, application integration platform 422, gateway 425, industrial asset 430, and gateway 435. Computing system 410 provides an example of computing system 125, although system 125 could use alternative configurations. Machine system 420, controller 421, application integration platform 422, gateway 425, and computing system 410 are in communication over respective communication links. Likewise, industrial asset 430, gateway 435, and computing system 410 communicate over respective communication links. Note that there would typically be many more machine systems and industrial assets in most industrial automation environments, but the number of machine systems and assets shown in FIG. 4 has been restricted for clarity. Also, although shown separately in FIG. 4, in at least one implementation machine system 420 could comprise industrial controller 421 or portions thereof.

Industrial automation network 400 is associated with an industrial automation enterprise, such as an automobile manufacturing factory, food processing plant, oil drilling operation, microprocessor fabrication facility, or some other type of industrial enterprise. Machine system 420 could comprise a sensor, drive, pump, filter, drill, motor, robot, fabrication machinery, mill, printer, or any other industrial automation equipment or component, including their associated control systems. A control system comprises, for example, industrial controller 421, which could include automation controllers, programmable logic controllers (PLCs), programmable automation controllers (PACs), or any other controllers used in automation control. In some examples, industrial controller 421 could comprise a ControlLogix® control system provided by Rockwell Automation, Inc. Additionally, machine system 420 could comprise other industrial equipment, such as a brew kettle in a brewery, a reserve of coal or other resources, a virtual representation of a physical device or component, or any other element that may reside in an industrial automation environment 400.

Machine system 420 continually produces operational data over time. The operational data indicates the current status of machine system 420, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 420 and/or controller 421 is capable of transferring the operational data over a communication link to application integration platform 422, gateway 425, and computing system 410, typically via a communication network.

Application integration platform 422 comprises a processing system and a communication transceiver. Application integration platform 422 may also include other components such as a router, server, data storage system, and power supply. Application integration platform 422 may reside in a single device or may be distributed across multiple devices. Application integration platform 422 may be a discrete system or may be integrated within other systems, including other systems within industrial automation network 400. In some examples, application integration platform 422 could comprise a FactoryTalk® VantagePoint server system provided by Rockwell Automation, Inc.

Industrial asset 430 may comprise any asset associated with or employed in industrial operations. In some examples, industrial asset 430 could comprise a machine, machine system, industrial controller, programmable logic controller (PLC), or some other machine or equipment employed in industrial automation operations, but could also comprise a virtual representation of a machine, such as an emulation, simulation application, or some other digital representation of a physical asset. Further, industrial asset 430 could comprise other systems associated with industrial operations, such as a cloud monitoring application, line integration application, analytic process, HMI systems, dashboards, overall equipment effectiveness (OEE) systems, faceplates, libraries, databases, servers, system integrators, development systems, testing systems, and any other industrial systems.

Gateways 425 and 435 each individually comprise a processing system and a communication transceiver. Gateways 425 and 435 may also include other components such as a router, server, data storage system, and power supply. Gateways 425 and 435 may each individually reside in a single device or may be distributed across multiple devices. Gateways 425 and 435 may be individual discrete systems or may be integrated within other systems, including other systems within industrial automation network 400.

In this example, machine system 420 and industrial asset 430 are located at separate and distinct geographical locations, and thus are not connected over the same local communication network. However, computing system 410 is configured to provide a VPN service for industrial automation network 400, which through gateways 425 and 435 enables interactions between machine system 420 and industrial asset 430 as if machine system 420 and industrial asset 430 were directly connected over the same local communication network.

The communication links over which data is exchanged could use metal, air, space, optical fiber such as glass or plastic, or some other material as the transport medium, including combinations thereof. The communication links could comprise multiple network elements such as routers, gateways, telecommunication switches, servers, processing systems, or other communication equipment and systems for providing communication and data services. These communication links could use various communication protocols, such as TDM, IP, Ethernet, telephony, optical networking, packet networks, wireless mesh networks (WMN), local area networks (LAN), metropolitan area networks (MAN), wide area networks (WAN), hybrid fiber coax (HFC), communication signaling, wireless protocols, communication signaling, peer-to-peer networking over Bluetooth, Bluetooth low energy, Wi-Fi Direct, near field communication (NFC), or some other communication format, including combinations thereof. The communication links could be direct links or may include intermediate networks, systems, or devices.

Computing system 410 may be representative of any computing apparatus, system, or systems on which the data collection processes disclosed herein or variations thereof may be suitably implemented. Computing system 410 provides an example of a computing system that could be used as a either a server or a client device in some implementations, although such devices could have alternative configurations. Examples of computing system 410 include mobile computing devices, such as cell phones, tablet computers, laptop computers, notebook computers, and gaming devices, as well as any other type of mobile computing devices and any combination or variation thereof. Examples of computing system 410 also include desktop computers, server computers, and virtual machines, as well as any other type of computing system, variation, or combination thereof. In some implementations, computing system 410 could comprise a mobile device capable of operating in a server-like fashion which, among other uses, could be utilized in a wireless mesh network.

Computing system 410 includes processing system 401, storage system 403, software 405, communication interface 408, and user interface 409. Processing system 401 is operatively coupled with storage system 403, communication interface 408, and user interface 409. Processing system 401 loads and executes software 405 from storage system 403. Software 405 includes application 406 and operating system 407. Application 406 may include remote integration process 200 in some examples, as indicated by the dashed line in FIG. 4. When executed by computing system 410 in general, and processing system 401 in particular, software 405 directs computing system 410 to operate as described herein for remote integration process 200 or variations thereof. In this example, user interface 409 includes display system 411, which itself may be part of a touch screen that also accepts user inputs via touches on its surface. Display system 411 may be omitted in some examples. Computing system 410 may optionally include additional devices, features, or functionality not discussed here for purposes of brevity.

Turning now to FIG. 5, a block diagram is shown that illustrates computing system 500 in an exemplary implementation. Computing system 500 provides an example of computing systems 125 and 410, or any computing system that may be used to execute remote integration process 200 or variations thereof, although systems 125 and 410 could use alternative configurations. Computing system 500 includes processing system 501, storage system 503, software 505, communication interface 507, and user interface 509. User interface 509 comprises display system 508. Software 505 includes application 506 which itself includes remote integration process 200. Remote integration process 200 may optionally be implemented separately from application 506, as indicated by the dashed line in FIG. 5.

Computing system 500 may be representative of any computing apparatus, system, or systems on which application 506 and remote integration process 200 or variations thereof may be suitably implemented. Examples of computing system 500 include mobile computing devices, such as cell phones, tablet computers, laptop computers, notebook computers, and gaming devices, as well as any other type of mobile computing devices and any combination or variation thereof. Note that the features and functionality of computing system 500 may apply as well to desktop computers, server computers, and virtual machines, as well as any other type of computing system, variation, or combination thereof.

Computing system 500 includes processing system 501, storage system 503, software 505, communication interface 507, and user interface 509. Processing system 501 is operatively coupled with storage system 503, communication interface 507, and user interface 509. Processing system 501 loads and executes software 505 from storage system 503. When executed by computing system 500 in general, and processing system 501 in particular, software 505 directs computing system 500 to operate as described herein for remote integration process 200 or variations thereof. Computing system 500 may optionally include additional devices, features, or functionality not discussed herein for purposes of brevity.

Referring still to FIG. 5, processing system 501 may comprise a microprocessor and other circuitry that retrieves and executes software 505 from storage system 503. Processing system 501 may be implemented within a single processing device but may also be distributed across multiple processing devices or sub-systems that cooperate in executing program instructions. Examples of processing system 501 include general purpose central processing units, application specific processors, and logic devices, as well as any other type of processing device, combinations, or variations thereof.

Storage system 503 may comprise any computer-readable storage media capable of storing software 505 and readable by processing system 501. Storage system 503 may include volatile and nonvolatile, removable and non-removable media implemented in any method or technology for storage of information, such as computer readable instructions, data structures, program modules, or other data. Storage system 503 may be implemented as a single storage device but may also be implemented across multiple storage devices or sub-systems co-located or distributed relative to each other. Storage system 503 may comprise additional elements, such as a controller, capable of communicating with processing system 501. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the computer-readable storage media a propagated signal.

In operation, processing system 501 may load and execute portions of software 505, such as remote integration process 200, to execute the operations described herein. Software 505 may be implemented in program instructions and among other functions may, when executed by computing system 500 in general or processing system 501 in particular, direct computing system 500 or processing system 501 to provide a virtual private network (VPN) service for an industrial automation network of an industrial automation enterprise. Software 505 may further direct computing system 500 or processing system 501 to communicate with a first gateway system to establish a first connection between a first industrial asset and the VPN service for the industrial automation network. In addition, software 505 directs computing system 500 or processing system 501 to communicate with a second gateway system to establish a second connection between a second industrial asset and the VPN service for the industrial automation network, wherein the second industrial asset is located at a disparate location than the first industrial asset. Finally, software 505 directs computing system 500 or processing system 501 to route bi-directional communications between the first industrial asset and the second industrial asset to enable interactions between the first industrial asset and the second industrial asset as if the first industrial asset and the second industrial asset were directly connected over a same local communication network.

Software 505 may include additional processes, programs, or components, such as operating system software or other application software. Examples of operating systems include Windows®, iOS®, and Android®, as well as any other suitable operating system. Software 505 may also comprise firmware or some other form of machine-readable processing instructions executable by processing system 501.

In general, software 505 may, when loaded into processing system 501 and executed, transform computing system 500 overall from a general-purpose computing system into a special-purpose computing system customized to facilitate communication between remote industrial assets as described herein for each implementation. For example, encoding software 505 on storage system 503 may transform the physical structure of storage system 503. The specific transformation of the physical structure may depend on various factors in different implementations of this description. Examples of such factors may include, but are not limited to the technology used to implement the storage media of storage system 503 and whether the computer-storage media are characterized as primary or secondary storage.

In some examples, if the computer-storage media are implemented as semiconductor-based memory, software 505 may transform the physical state of the semiconductor memory when the program is encoded therein. For example, software 505 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 500 is generally intended to represent a computing system with which software 505 is deployed and executed in order to implement application 506 and/or remote integration process 200 (and variations thereof). However, computing system 500 may also represent any computing system on which software 505 may be staged and from where software 505 may be distributed, transported, downloaded, or otherwise provided to yet another computing system for deployment and execution, or yet additional distribution. For example, computing system 500 could be configured to deploy software 505 over the internet to one or more client computing systems for execution thereon, such as in a cloud-based deployment scenario.

Communication interface 507 may include communication connections and devices that allow for communication between computing system 500 and other computing systems (not shown) or services, over a communication network 511 or collection of networks. In some implementations, communication interface 507 receives dynamic data 521 over communication network 511. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 509 may include a voice input device, a touch input device for receiving a gesture from a user, a motion input device for detecting non-touch gestures and other motions by a user, and other comparable input devices and associated processing elements capable of receiving user input from a user. Output devices such as display system 508, speakers, haptic devices, and other types of output devices may also be included in user interface 509. The aforementioned user input devices are well known in the art and need not be discussed at length here. User interface 509 may also include associated user interface software executable by processing system 501 in support of the various user input and output devices discussed above. Separately or in conjunction with each other and other hardware and software elements, the user interface software and devices may provide a graphical user interface, a natural user interface, or any other kind of user interface. User interface 509 may be omitted in some examples.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. One or more computer-readable storage media having program instructions stored thereon to facilitate communication between remote industrial assets, wherein the program instructions, when executed by a computing system, direct the computing system to at least:
   communicate with a first gateway system to establish a first connection between a first industrial asset and a Virtual Private Network (VPN) for an industrial automation network of an industrial automation enterprise;
   communicate with a second gateway system to establish a second connection between a second industrial asset and the VPN for the industrial automation network, wherein the second industrial asset is located at a different geographic location than the first industrial asset; and
   perform line integration testing between the first industrial asset and the second industrial asset by routing bi-directional communications between the first industrial asset and the second industrial asset over the VPN.

2. The one or more computer-readable storage media of claim 1 wherein the program instructions further direct the computing system to enable interactions in addition to the line integration testing between the first industrial asset and the second industrial asset over the VPN.

3. The one or more computer-readable storage media of claim 2 wherein performing the line integration testing between the first industrial asset and the second industrial asset comprises utilizing a line controller function to coordinate a workflow of the first industrial asset and the second industrial asset.

4. The one or more computer-readable storage media of claim 1 wherein the program instructions direct the computing system to communicate with the first gateway system to establish the first connection and communicate with the second gateway system to establish the second connection during a scheduled timeframe.

5. The one or more computer-readable storage media of claim 1 wherein the program instructions direct the computing system to provide the VPN for the industrial automation network by directing the computing system to establish a secure tunnel to the VPN for the industrial automation network.

6. The one or more computer-readable storage media of claim 5 wherein the first gateway system is configured to bridge the first industrial asset onto the industrial automation network through the secure tunnel, and wherein the second gateway system is configured to bridge the second industrial asset onto the industrial automation network through the secure tunnel.

7. The one or more computer-readable storage media of claim 1 wherein the first industrial asset is located within a premises of the industrial automation enterprise.

8. A method to facilitate communication between remote industrial assets, the method comprising:
   communicating with a first gateway system to establish a first connection between a first industrial asset and a Virtual Private Network (VPN) for an industrial automation network of an industrial automation enterprise;
   communicating with a second gateway system to establish a second connection between a second industrial asset and the VPN for the industrial automation network, wherein the second industrial asset is located at a different geographic location than the first industrial asset; and
   performing line integration testing between the first industrial asset and the second industrial asset by routing bi-directional communications between the first industrial asset and the second industrial asset over the VPN.

9. The method of claim 8 further comprising enabling interactions in addition to the line integration testing between the first industrial asset and the second industrial asset.

10. The method of claim 9 wherein performing the line integration testing includes utilizing a line controller function to coordinate a work flow of the first industrial asset and the second industrial asset.

11. The method of claim 8 wherein communicating with the first gateway system to establish the first connection and communicating with the second gateway system to establish the second connection occurs during a scheduled timeframe.

12. The method of claim 8 wherein providing the VPN for the industrial automation network comprises establishing a secure tunnel to the VPN for the industrial automation network.

13. The method of claim 12 wherein the first gateway system is configured to bridge the first industrial asset onto the industrial automation network through the secure tunnel, and wherein the second gateway system is configured to bridge the second industrial asset onto the industrial automation network through the secure tunnel.

14. The method of claim 8 wherein the first industrial asset is located on-premises with respect to the industrial automation enterprise.

15. An apparatus to facilitate communication between remote industrial assets, the apparatus comprising:
   one or more computer-readable storage media; and
   program instructions stored on the one or more computer-readable storage media that, when executed by a processing system, direct the processing system to at least:
   communicate with a first gateway system to establish a first connection between a first industrial asset and a Virtual Private Network (VPN) for an industrial automation network of an industrial automation enterprise;
   communicate with a second gateway system to establish a second connection between a second industrial asset and the VPN for the industrial automation network, wherein the second industrial asset is located at a different geographic location than the first industrial asset; and perform line integration testing between the first industrial asset and the second industrial asset by routing bi-directional communications between the first industrial asset and the second industrial asset over the VPN.

16. The apparatus of claim 15 wherein the program instructions further direct the processing system to enable interactions in addition to the line integration testing between the first industrial asset and the second industrial asset.

17. The apparatus of claim 16 wherein the line integration testing includes a line controller function to coordinate a workflow of the first industrial asset and the second industrial asset.

18. The apparatus of claim 15 wherein the program instructions direct the processing system to communicate with the first gateway system to establish the first connection and communicate with the second gateway system to establish the second connection during a scheduled timeframe.

19. The apparatus of claim 15 wherein the program instructions direct the processing system to provide the VPN for the industrial automation network by directing the processing system to establish a secure tunnel to the VPN for the industrial automation network.

20. The apparatus of claim 19 wherein the first gateway system is configured to bridge the first industrial asset onto the industrial automation network through the secure tunnel, and wherein the second gateway system is configured to bridge the second industrial asset onto the industrial automation network through the secure tunnel.

* * * * *